United States Patent
Carvell et al.

(10) Patent No.: US 8,263,198 B2
(45) Date of Patent: Sep. 11, 2012

(54) SYSTEM AND METHOD FOR CREATING HIGH GLOSS PLASTIC ITEMS VIA THE USE OF STYRENIC COPOLYMERS AS A COEXTRUDED LAYER

(75) Inventors: Lee A. Carvell, Bartlesville, OK (US); Mark Wanderlich, Loganville, GA (US); Susan L. Banovic, Hoschton, GA (US); James Jalutkewicz, Duluth, GA (US); Charles E. Rees, Bartlesville, OK (US); Michael A. Smith, Bartlesville, OK (US)

(73) Assignees: Chevron Phillips Chemical Company LP, The Woodlands, TX (US); Silgan Holdings, Inc., Chesterfield, MO (US)

( * ) Notice: Subject to any disclaimer, the term of this patent is extended or adjusted under 35 U.S.C. 154(b) by 0 days.

(21) Appl. No.: 11/904,155

(22) Filed: Sep. 26, 2007

(65) Prior Publication Data

US 2009/0081397 A1    Mar. 26, 2009

(51) Int. Cl.
B32B 27/32 (2006.01)
B32B 7/02 (2006.01)
B29D 22/00 (2006.01)

(52) U.S. Cl. ...... 428/35.9; 428/212; 428/215; 428/218; 428/220; 428/521

(58) Field of Classification Search ................ 428/35.7, 428/36.8; 264/454
See application file for complete search history.

(56) References Cited

U.S. PATENT DOCUMENTS

| | | | | |
|---|---|---|---|---|
| 3,645,822 A * | 2/1972 | Widiger et al. | | 156/243 |
| 4,079,850 A * | 3/1978 | Suzuki et al. | | 215/12.2 |
| 4,292,355 A * | 9/1981 | Bonis | | 428/35.7 |
| 4,858,758 A * | 8/1989 | Mitchell et al. | | 206/205 |
| 5,635,262 A * | 6/1997 | Best et al. | | 428/36.92 |
| 6,498,204 B1 * | 12/2002 | Ubara | | 524/12 |
| 2002/0015811 A1 | 2/2002 | Gusavage et al. | | |
| 2004/0121098 A1 | 6/2004 | Maziers | | |
| 2004/0126520 A1 | 7/2004 | Samarcq | | |
| 2004/0253468 A1 * | 12/2004 | Donnelly et al. | | 428/515 |
| 2006/0051538 A1 | 3/2006 | Maziers | | |
| 2006/0182910 A1 | 8/2006 | Wu et al. | | |
| 2006/0235118 A1 * | 10/2006 | Selby et al. | | 524/186 |

FOREIGN PATENT DOCUMENTS

| | | |
|---|---|---|
| EP | 1300240 | 10/2001 |
| EP | 1432575 | 4/2003 |
| JP | 5038787 | 2/1993 |
| JP | 2243338 | 3/1998 |
| JP | 2243340 | 3/1998 |
| JP | 11005275 | 1/1999 |

OTHER PUBLICATIONS

Chevron Phillips K-Resin(R) KR03 Datasheet, MatWeb.com, (Date retrieved Oct. 31, 2008 ).*
Chevron Phillips K-Resin(R) KR05 Datasheet, MatWeb.com, (Date retrieved Oct. 31, 2008).*

* cited by examiner

*Primary Examiner* — Maria Veronica Ewald
*Assistant Examiner* — Prashant J Khatri
(74) *Attorney, Agent, or Firm* — Fletcher Yoder

(57) ABSTRACT

The present techniques provide multi-layer plastic structures and methods for making such. The multi-layer plastic structures include an inner surface made from a polyolefin resin, and resistant to environmental stress cracking, and an outer surface that includes a styrenic copolymer. The outer surface has a kinetic coefficient of friction with itself of 0.42 and a static coefficient of friction with itself of 0.44.

25 Claims, 5 Drawing Sheets

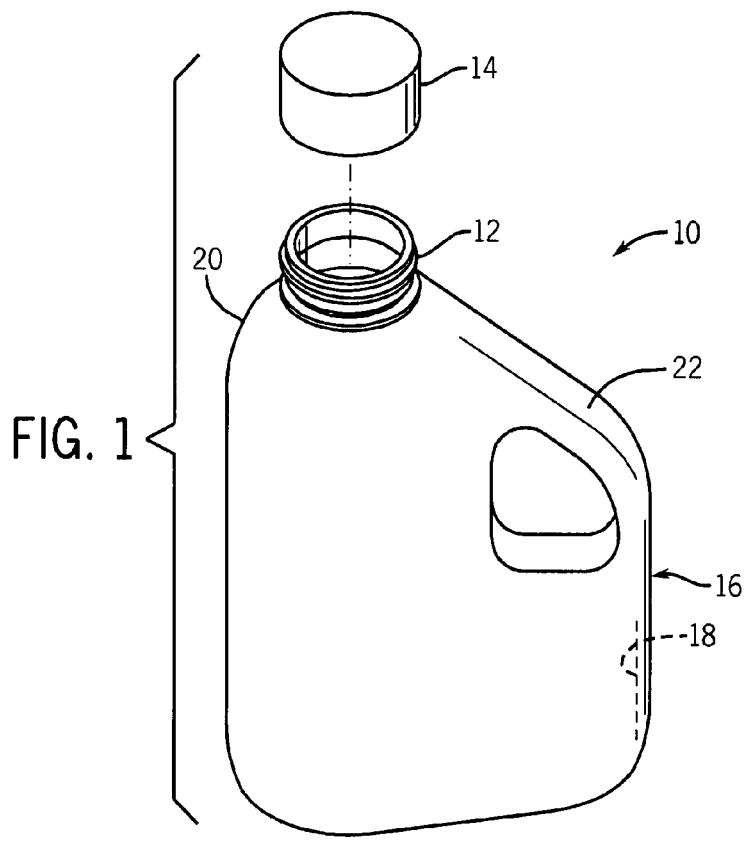
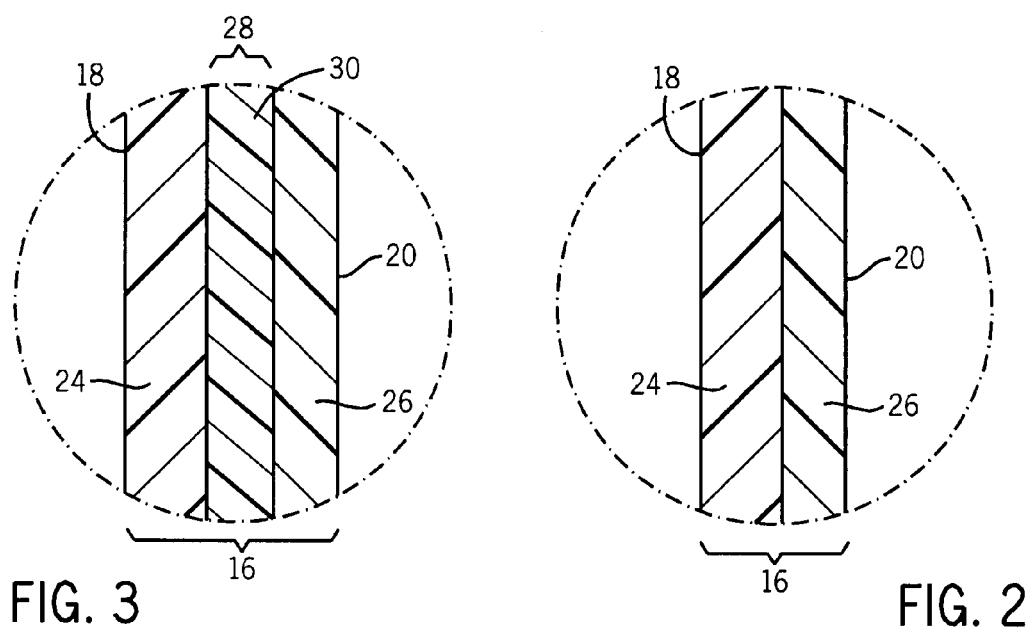

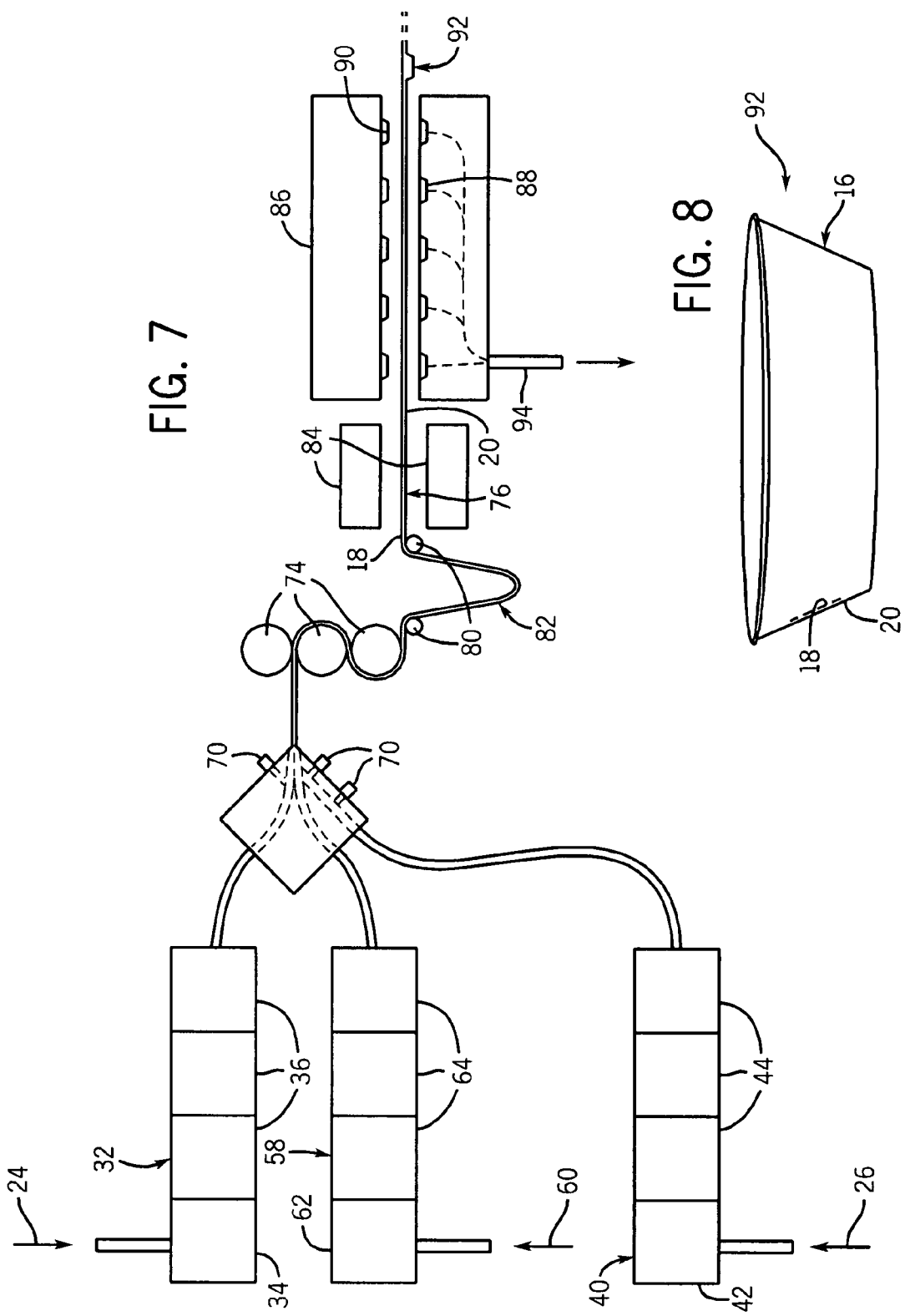

SYSTEM AND METHOD FOR CREATING HIGH GLOSS PLASTIC ITEMS VIA THE USE OF STYRENIC COPOLYMERS AS A COEXTRUDED LAYER

BACKGROUND OF THE INVENTION

1. Field of the Invention

The present techniques relate generally to the formation of plastic bottles and other plastic articles. Specifically, the present techniques relate to the production of plastic bottles and articles having good environmental stress crack resistance and a high gloss outer surface.

2. Description of the Related Art

This section is intended to introduce the reader to various aspects of art which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasing prevalent in society. In particular, as techniques for bonding simple molecular building blocks into long chains, or polymers, have advanced, polymer products have been increasingly incorporated into various everyday items. For example, polymers such as polystyrene, polyethylene, polypropylene, and various copolymers, are used for retail and pharmaceutical packaging, food and beverage packing, household containers, household items, automobile components, pipes, conduits, toys, and various industrial products.

Specific types of polymers, such as high density polyethylene (HDPE), have particular applications in the manufacture of blow molded and injection molded goods, such as food and beverage containers, film, and plastic pipes. HDPE provides a number of advantages for these applications, for example, resistance to an effect known as environmental stress cracking. Environmental stress cracking is the degradation of a plastic product in contact with a particular material or solvent. When the product in contact with the problem material is placed under stress, it may result in cracking of the polymer leading to failure. This failure may result in the release of the contents.

Further, HDPE is generally a strong and stiff material with low oxygen and moisture vapor transmission, and thus provides high barrier properties. The combination of environmental stress crack resistance, strength, stiffness, raw material cost and barrier properties makes HDPE a suitable material for packaging containers (e.g., bottles) for soap, milk, or other materials that need high protection from the environment or that may cause stress cracking of other types of polymers. However, HDPE typically has the disadvantage that formed products have a low surface gloss. For many applications, the low surface gloss decreases the brilliance and attractiveness of the marketing materials on the exterior of the HDPE bottle.

Containers may be constructed of other polymers, such as those made using large amounts of styrene, to provide a higher surface gloss. Unfortunately, however, styrenic copolymers may have significant disadvantages when used as containers for particular materials. For example, many styrenic copolymers are sensitive to environmental stress cracking and cannot be used for such applications as soap, which may cause the container to fail. Further, such copolymers may not have the moisture barrier properties to protect some materials from evaporative losses over time. For example, high water content materials, such as aqueous solutions, may experience noticeable product loss over a shorter period of time when kept in a bottle made from a styrenic copolymer versus a bottle made from HDPE.

A number of techniques have been tested to improve the surface gloss of products made from HDPE, such as bottles. These techniques have included coextrusion with other polymers that provide a higher surface gloss. Examples of higher gloss polymers tested include specialty medium density polyethylene (MDPE) grades. However, in addition to having a lower gloss than a polymer made with a large amount of styrene, products made having an outer surface of MDPE may have a waxy surface and problems with label adhesion, for example.

Styrenic copolymers have also been tested in coextruded applications to improve the gloss of HDPE products. However, these polymers have increased the surface friction of the products, leading to problems with the products feeding through the machinery and equipment required for filling, labeling, or other processing operations. Further, in many cases, these polymers may be sensitive to scratching, leading to poor surface appearance when the blow molded article reaches the marketing outlet for sale to the end consumer.

BRIEF DESCRIPTION OF THE DRAWINGS

Advantages of the invention may become apparent upon reading the following detailed description and upon reference to the drawings in which:

FIG. 1 is a perspective view of a bottle having a handle that may have two or more layers in accordance with an embodiment of the present techniques;

FIG. 2 is a cross-sectional view of a two layered structure in accordance with an embodiment of the present techniques;

FIG. 3 is a cross-sectional view of a three layered structure in accordance with an embodiment of the present techniques;

FIG. 7 is a co-extrusion system for the formation of a thermoformed article having three layers in accordance with an embodiment of the present techniques; and FIG. 8 is a perspective view of a thermoformed product made from a multi-layer cast sheet in accordance with an embodiment of the present techniques.

DETAILED DESCRIPTION OF SPECIFIC EMBODIMENTS

Figure 4:
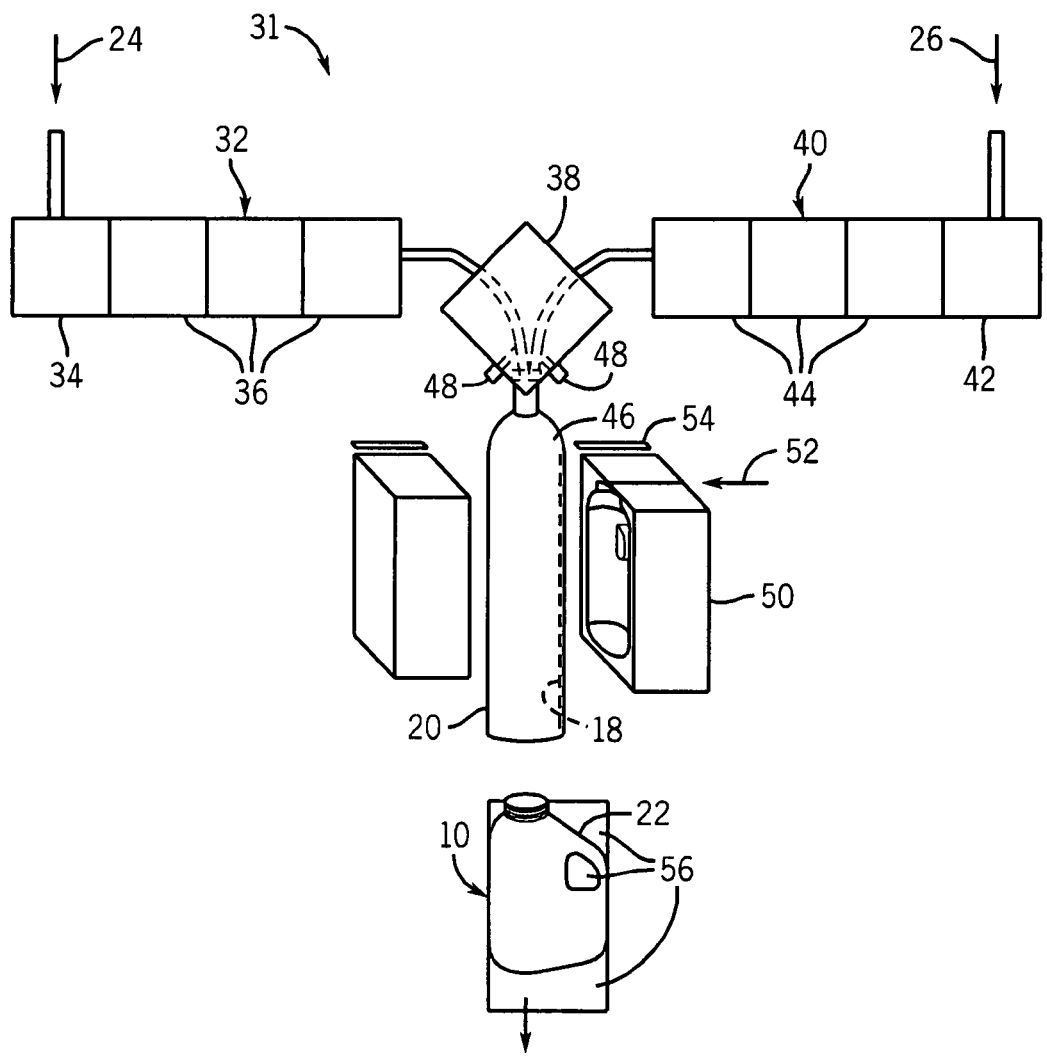
FIG. 4 is a co-extrusion blow molding apparatus for the formation of a blow molded article that may have two layers in accordance with an embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques include multi-layer plastic structures having a first surface layer (e.g., an internal layer) that includes a high-density type of polyethylene or other types of polyolefins and a second surface layer (e.g., an external layer) made from a styrenic copolymer having a high surface gloss. These multi-layer plastic structures may provide functionality to a number of different applications that benefit from having a resistance to environmental stress cracking caused by the materials contained within the multi-layer plastic structures and an improved exterior appearance for marketability. For example, applications that may benefit from this type of multi-layer plastic structure include plastic containers, such as bottles and/or cups, and various other plastic items, including, for example, toys, among others.

Further, the exterior high-gloss layer of the present multi-layer plastic structures may provide for decreased friction between individual containers, thereby reducing the risk of the containers binding in handling, for example, during filling or processing operations. The decrease in surface friction may also decrease surface damage resulting from scuffing of adjacent containers. One skilled in the art will recognize that binding or scuffing may take place during any number of processing steps involved in, for example, filling a container with a product. Processing steps in which containers made from the present multi-layer plastic structures may provide benefits include, among others: feeding containers from a turntable; sliding the containers onto a conveyor belt from a chute; conveying the containers between side rails on a conveyor belt; filling the containers in a filing machine; capping and/or otherwise affixing lids to the containers; affixing labels and/or printing on the containers; and packing the containers in a box, either manually or with the aid of an automated box packing machine.

An example of a container made from the present multi-layer plastic structures is shown in FIG. 1. In this illustrated embodiment, a blow-molded bottle 10 is depicted in perspective view. The blow-molded bottle 10 has a threaded top surface 12 which can be used to attach a cap 14. The bottle may be made from a multi-layer wall 16 having an inside surface 18 and an outside surface 20. In certain embodiments, the bottle may have a handle 22 molded into the body of the bottle. The choice of including a handle 22 may be based on consumer convenience versus the extra cost required for manufacturing the handle 22, for example, in the larger amount of scrap that may be generated. As discussed below, the properties beneficial to the bottle, e.g., material to be contained, stiffness, gloss, layer adhesion, coefficient of friction, etc., control the polymers chosen for the inside surface 18 and outside surface 20.

A cross-section of a structure that may be used for the multi-layer wall 16 is shown in FIG. 2. This figure illustrates a two layer wall, in which the inner surface 18 is made from a first material 24 while the outer surface 20 is made from a second material 26. The first material 24 may be a polyolefin resin, such as homopolymers or copolymers of polyethylene or polypropylene. The choice of the particular polyolefin used for the first material 24 may depend on the properties desired. For example, a high density polyethylene (HDPE) may be selected if resistance to environmental stress cracking caused by the contents is desired. In other applications, a more flexible polymer may be selected, and thus a low or medium density polyethylene (LDPE or MDPE) or a polypropylene (PP) resin may be chosen. In embodiments of the present technique, a polyethylene having a density of about 0.91 g/cm$^3$ to about 0.97 g/cm$^3$ may be used, while in other embodiments a polyethylene having a density of about 0.95 g/cm$^3$ to about 0.97 g/cm$^3$ may be used. In embodiments of the present technique, a polyethylene having a melt index of less than about 2 g/10 min may be used, while in other embodiments a polyethylene having a melt index of less than about 1 g/10 min may be used, while in other embodiments a polyethylene having a melt index of from about 0.1 g/10 min to about 0.6 g/10 min may be used. In still other embodiments a polypropylene may be selected. Such HDPE, PP, or MDPE resins may be available from Chevron Phillips Chemical Company LP of The Woodlands, Tex. under the Marlex® trade name. For example, in an embodiment, the bottle may be formed using a first material including a polyethylene having a density of about 0.955 g/cm$^3$ and a Melt Index of about 0.35 g/10 min, sold under the trade name Marlex® 5502 BN by Chevron Phillips Chemical Company LP.

The second material 26 may be a styrenic copolymer or a blend of polymers. The selection of the second material 26 depends on the properties desired for the outer surface 20. For example, the outer surface 20 may be a material having a low coefficient of friction with itself, high gloss, and ease of processability. An example of such a material is K-Resin® styrene butadiene copolymer (SBC) grade XK-44, available from the Chevron Phillips Chemical Company, LP. This polymer may provide an outer surface 26 having a static coefficient of friction of about 0.38, a kinetic coefficient of friction of about 0.29, and a surface gloss of about 91%.

The values for the coefficient of friction were measured using ASTM D-1894-93, where a 200 gram weight was used for holding the surfaces together, and where both the stationary and sliding surfaces were made from the same styrenic polymer. The values for surface gloss were measured using ASTM 0-523-89 (1999) at a 60° angle on a BYK Gardner® Gloss meter.

In other applications (e.g., A, B, C, etc.) a second material 26 having greater stiffness than the XK-44 (e.g., greater than about 152,000 psi) may be beneficial. In these applications, the product may incorporate a styrene butadiene copolymer having higher stiffness (e.g., about 230,000 psi), such as the K-Resin® SBC grade KR05, available from Chevron Phillips Chemical Company, LP. In this example, the static coefficient of friction between two outer surfaces 26 made from this polymer is about 0.42, and the kinetic coefficient of friction is about 0.40. The surface gloss of parts made with the KR05 is about 89.1%.

One of ordinary skill in the art will recognize that the first material 24 and second material 26 may incorporate other SBCs having similar values for coefficients of friction (COFs) and gloss measurements to the polymers discussed above. Indeed, any number of other styrenic copolymers having the appropriate properties may be selected to form the first material 24 and second material 26. Such styrenic copolymers may include, for example, styrene acrylonitrile, among others. Additionally, polymers made from certain other monomers may be classified as essentially styrenic in nature. These monomers include organic compounds having a single carbon-carbon double bond, at least one aromatic moiety, and a total of 8 to 18 carbon atoms, such as 8 to 12 carbon atoms. Examples of such styrenic monomers include styrene, alpha-methylstyrene, 2-methylstyrene, 3-methylstyrene, 4 methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. Thus, any reference to a styrenic monomer includes any of the compounds listed above, as well as similar compounds.

However, the use of styrenic copolymers having higher COFs may be problematic due, in part, to excessive coefficients of friction of the outside surfaces 20. For example, many commercial SBCs have coefficients of friction between two surfaces made from the SBC of about 0.48 (static) and about 0.45 (kinetic) which may be too high for use in many filling, labeling and other processing machines.

If other properties would be beneficial for the application, the second material 26 may be a blend of an SBC and other polymers. In such blends, however, it is generally desirable that the addition of the other polymers not increase the COFs, such as between two of the bottles 10 shown in FIG. 1, beyond about 0.44 (static) or about 0.42 (kinetic). For example, a styrenic polymer that may be useful for increasing the stiffness of such blends is EA3710, a general purpose crystal polystyrene available from Chevron Phillips Chemical Company, LP. Another option is to blend a polyolefin, such as used in the first material 24, into the second material 26. This may reduce the gloss of the outer surface 20, but results in a pearlescent appearance that may be beneficial for the product's market appeal.

The first material 24 and/or the second material 26 may contain other additives. Such additives may include, for example, dyes, pigments, stabilizers, flow-enhancers, antiblock agents, adhesive polymers or other materials configured to improve the appearance or functionality of the part. For example, in embodiments of the present techniques, the first material 24 and/or the second material 26 may include a small amount of a dye, pigment or other color producing additive. If this colorant is in the first material 24, the gloss of the outer surface 20, as produced by the second material 26, may be enhanced. If the color additive is included in the second material 26, the different colors of the inner surface 18 may give the container a two-tone appearance.

The use of a two layer structure, such as that illustrated in FIG. 2, may lead to significant amounts of wasted material. As discussed in detail with respect to FIGS. 4-7, below, such waste material is created when excess material is trimmed from a blow-molded bottle or thermoformed product. In other applications, the waste material may be ground and the resulting material, described herein as "regrind", added to either the first material 24 or the second material 26 for inclusion in the part. However, in this application, such addition of the regrind to either of these materials may compromise the final properties of the layer. For example, addition of the regrind to the first material 24 may compromise the ability of the container to hold certain products, as the regrind will contain some amount of the second material 26 which may be vulnerable to attack by the contents. Additionally, addition of the regrind to the first material 24 may compromise the barrier properties of the inner layer, allowing water loss from aqueous solutions. Further, addition of the regrind to the second material 26 may compromise the appearance of the part, as the regrind will contain some amount of the lower gloss first material 24. To overcome these difficulties and still eliminate the waste, the regrind may be included in a separate layer in the structure.

A cross-sectional view of a multilayer wall 16 that includes three layers is shown in FIG. 3. In this illustration, the inner surface 18 is made from the first material 24 and the outer surface 26 is made from the second material as discussed above. A center layer 28 is formed between the inner surface 18 and the outer surface 20. The center layer 28 is made of a third material 30 which includes the regrind discussed above. The thickness of the layers determines the amount of the first material 24 and the second material 26 contained within the third material 30. For example, the inner surface 18 may be about 25 to about 75 mils (thousandths of an inch) in thickness, while the outer surface 20 may be about 1 to about 10 mils in thickness. As the bottle production reaches a stable bottle and regrind production, a center layer 28 having a composition ratio of about 1:10 to about 1:100 of the second material 26 to the first material 24 would be created. The thickness of this layer would be about 13 to about 37 mils. One skilled in the art will recognize that the final thickness of the various layers will depend on the properties of the part desired and may be incremental adjusted during production to achieve the desired properties.

A multi-layer bottle 10, as discussed with respect to FIG. 1, may be formed using a two layer co-extrusion blow molding process 31 as shown in the block diagram of FIG. 4. In this process 31, a first extruder 32 is used to melt the first material 24 to form a first melt. The melting process is done in a series of zones having different temperature levels starting with a first extruder feed-throat zone 34 having the lowest temperature, between about 300° F. and 350° F. or between about 320° F. and 340° F. The first extruder feed-throat zone 34 feeds the partially melted pellets of the first material 24 into the first extruder melt zones 36. In the first extruder melt zones 36, the pellets are melted and pressurized before being forced out of the extruder 32 as a first melt into a blow molding co-extrusion head 38. For a first material 24 that includes a polyethylene, the first extruder melt zones 36 may be set from about 360° F. to about 375° F. to generate a first melt having a temperature of about 360° F. to about 370° F.

Similarly, a second extruder 40 is used to melt the second material 26 to form a second melt. The second extruder 40 has a second extruder feed-throat zone 42 used to force the partially melted pellets of the second material 26 into the second extruder melt zones 44. After melting of this second material 26, the second melt is forced into the blow molding co-extrusion head 38. The temperatures of the second extruder's feed throat zone 42 and melt zones 44 may be similar to those used for the first material 24. In the blow molding co-extrusion head 38 the molten first material 24 and the molten second material 26 are combined into a multilayer structure and pushed out as a co-extruded parison 46, with an inner surface 18 and an outer surface 20, as discussed above.

The temperature of the blow molding co-extrusion head 38 closely matches that of the extruder melt zones 36,44 and may be set from about 360° F. to about 375° F. The thickness of each of the layers may be controlled by adjustment screws 48. After the co-extruded parison 46 has been extruded through the area of the blow mold 50, the blow mold 50 is clamped over the parison 46, and a knife 54, or similar apparatus integral to the blow mold 50, is used to cut the molten parison 46. Air is then injected through an air injection nozzle 52, at a pressure of between about 40 psi and about 80 psi, to inflate the co-extruded parison 46 until the parison is fully in contact with all surfaces of the blow mold 50. The blow mold 50 is set to a much lower temperature than the plastic melt, typically about 60° F. to about 80° F., to cause the partially molten plastic to harden to a multilayer plastic structure.

After a period sufficient for the co-extruded parison 46 to harden, typically from about 1 to about 90 seconds depending on the size of the part, the blow-molded bottle 10 thus formed may then be dropped from the blow mold 50 to a bin (not shown). As a result of the forming process, the blow molded bottle 10 has trim scrap 56, located around the bottle 10 and within the area of the handle 22. This trim scrap 56 corresponds to those parts of the co-extruded parison 46 that were not inflated during the molded process. For a bottle having a two layer wall 16, the trim scrap 56 is removed and may then be discarded, used in other processes, or sold to other processors.

Figure 5:
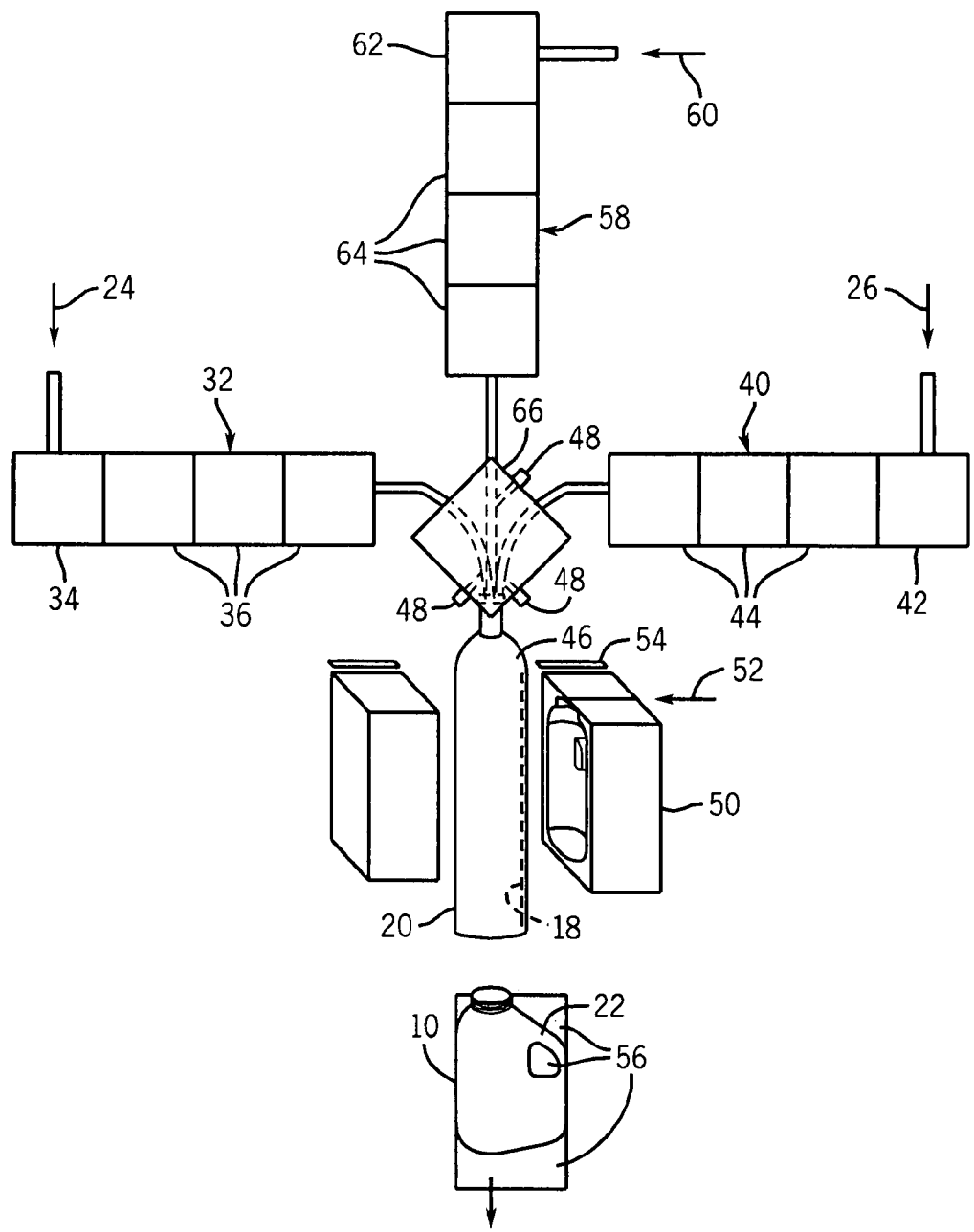
FIG. 5 is a co-extrusion blow molding apparatus for the formation of a blow molded article that may have three layers in accordance with an embodiment of the present techniques.

However, the trim scrap 56 may be ground and recycled back into the structure to form a center layer 28, as discussed with respect to FIG. 3, above. A block diagram of a co-extrusion blow molding process for forming a bottle 10 having a three layer wall 16 is shown in FIG. 5. This process is similar to the two layer process 31 discussed with respect to FIG. 4, with the addition of a third extruder 58. The third extruder 58 is used to melt a third material 60, forming a third melt which includes the regrind from the trim scrap 56. The third extruder feed zone 62 may be set to a lower temperature than for the first extruder 32 or second extruder 40, to compensate for the different shape of the third material 60 resulting from the grinding process. For example, the third extruder feed zone may typically be set between about 250° F. and about 350° F. or between about 300° F. and about 350° F. The third extruder melt zones 64 may be set to match the temperature of the first extruder 32 and the second extruder 40, e.g., typically between about 360° F. and about 375° F. The third melt material 60 is fed into a three layer co-extrusion blow molding head 66, which may be set to the same temperatures as discussed with respect to FIG. 4, above. The three layer co-extrusion blow molding head 66 produces a parison 46 wherein the third melt is disposed in a layer between the first melt and the second melt The thickness of the individual layers may be set by adjustment screws 48.

The remainder of the process is similar to that used for the two layer co-extrusion process 31, with the exception that the trim scrap 56 may also be recovered and ground for use in the third material 60. The third material 60 may also include other additives, such as colorants, stabilizers, or adhesive polymers, among others. Further, small amounts of the first material 24 or the second material 26 may be added to the regrind to form the third material 60. Such additions may be made to improve the processability or properties of the third material 60.

The multi-layered walls 16 discussed with respect to FIGS. 2 and 3, above, are not limited to use in bottles, but may be used in any number of other products as well. Many of the most important uses may be produced using sheet extrusion processes, such as, for example, sheet, cups, deli-cups, toys, or other similar items.

Figure 6:
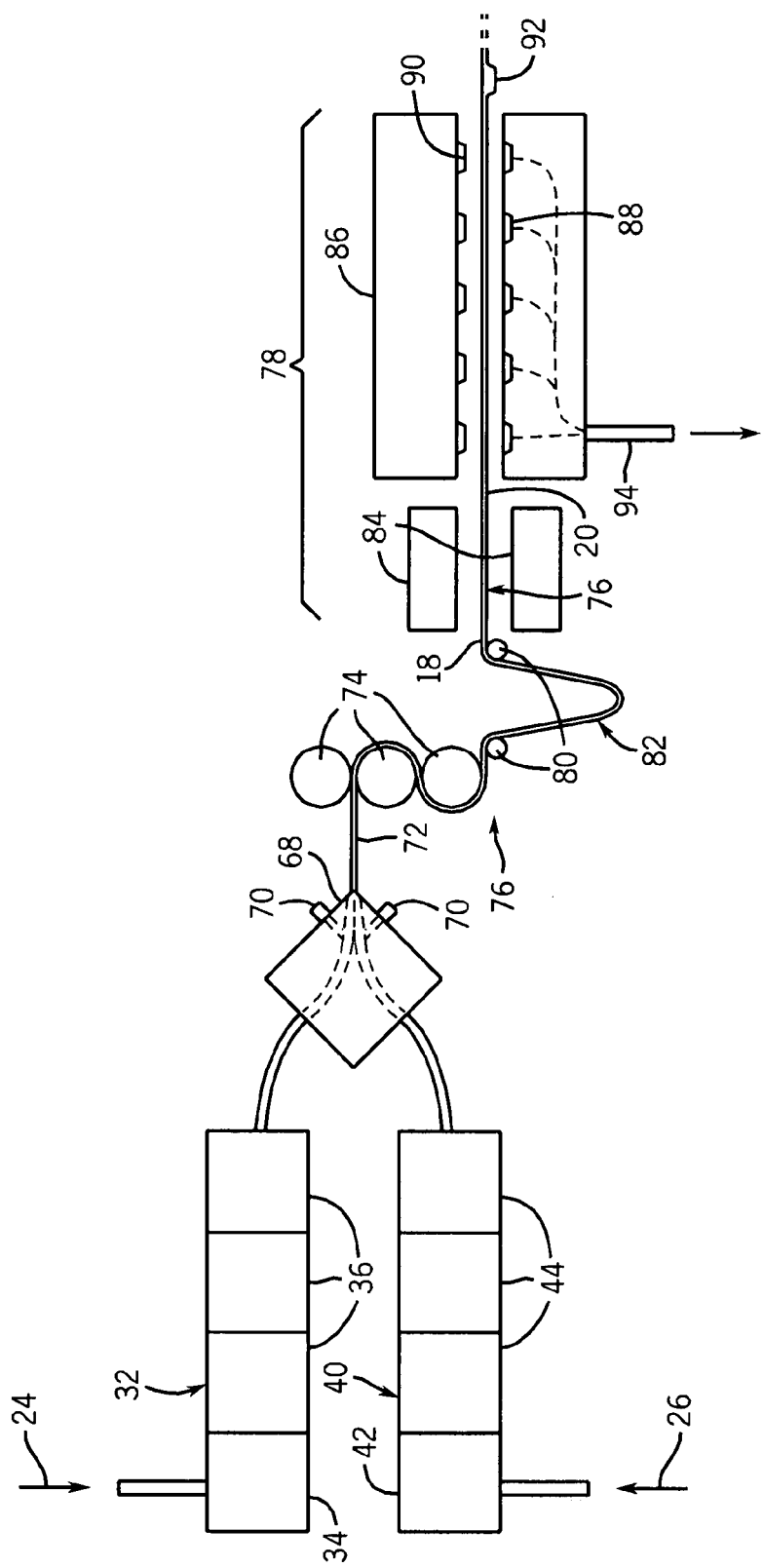
FIG. 6 is a co-extrusion system for the formation of a thermoformed article having two layers in accordance with an embodiment of the present techniques.

A sheet extrusion process followed by a thermoforming process may be used to form these types of structures is shown in FIG. 6, which is a block diagram of a sheet co-extrusion line for the formation of two layer sheet structures. In FIG. 6, the first extruder 32 is used to melt the first material 24 and feed it into a two layer sheet co-extrusion die 68. A second extruder 40 is used to melt the second material 26 and feed it into the co-extrusion die 68. The melt process is analogous to that discussed with respect to FIGS. 4 and 5. However, the temperatures used may be higher than those used in the blow molding process. In sheet extrusion the temperature for the first extruder melt zones 36, used for the polyolefin, may be between about 380° F. and about 400° F. The temperatures for the second extruder melt zones 44 may be between about 420° F. and about 435° F. In the two layer sheet co-extrusion die 68, the melted first material 24 is spread out into a large flat area and is forced into contact with the melted second material 26 which is spread out on the opposing side. The temperature of the two layer sheet co-extrusion die 68 may be between about 380° F. and about 420° F. The thickness of the two layers thus formed is controlled by adjustment screws 70. The multi-layer molten sheet 72 is forced out of the two layer sheet co-extrusion die 68 and through a series of pinch rollers 74. The pinch rollers 74 control the thickness of the final structure and help to maximize the gloss of the outer layer 20. Further, the pinch rollers 74 are chilled to between about 175° F. and about 190° F. to solidify the molten multi-layer sheet 72 into the final layered sheet. The final layered sheet, called a co-extruded web 76, may be rolled up for later use in forming a final product, or for sale to a separate organization that manufactures the final products. Alternatively, as shown in FIG. 6, the co-extruded web 76 may be sent through an in-line thermoforming process 78 to form a final product immediately.

As the thermoforming process 78 is intermittent in comparison to the continuous extrusion process, two take up rollers 80 are used to allow some slack 82 to develop in the co-extruded web 76. The slack 82 increases while the thermoforming process 78 is stopped for heating and thermoforming, and then pulled out of the co-extruded web 76 when the thermoforming process 78 is advanced. The thermoforming process 78 uses an in-line heater 84 to heat and soften the co-extruded web 76. The inside surface 18 is at the top of the co-extruded web relative to the thermoformed product, while the outside surface 20 is at the bottom in this illustration. The temperature of the in-line heater 84 may be between about 650° F. and about 750° F. After the in-line heater 84 has softened the co-extruded web 76, typically within about 20 to about 60 seconds, the co-extruded web 76 is advanced into a thermoforming mold 86. In the thermoforming mold 86 a series of indentations 88 and a series of protrusions 90 clamp together to force the co-extruded web 76 into the rough shape of the final thermoformed product 92. To ensure that the final thermoformed product 92 has a repeatable shape and that the co-extruded web 76 completely fills each indentation 88 a vacuum is pulled through a vacuum line 94 which pulls the molten co-extruded web 76 into contact with the inner surface of each indentation 88. The thermoforming mold 86 is chilled to between about 60° F. and about 80° F. to ensure that the thermoformed products 92 hold their shape when the thermoforming mold 86 is opened. In final processing steps (not shown) the thermoformed products 92 are cut apart and any final processing needed, such as rolling a rounded lip, may be performed. As discussed above, with respect to FIG. 4, the two layer scrap produced from cutting apart the thermoformed products 92 creates significant waste, as it may not be able to be ground and the regrind recycled into either layer.

The problems with waste may be remedied by creating a three layer sheet structure using the process shown in the block diagram of FIG. 7. This process is similar to that discussed with respect to FIG. 6, with the addition of the third extruder 58 to incorporate a third material 60 into the center layer 28 between the inner surface 18 and the outer surface 20 (see FIG. 3). The third material 60 includes the regrind scrap from the trimming process used to separate the final thermoformed products 92 from the co-extruded web 76. The temperature settings for the third extruder feed zone 62 are typically between about 275° F. and about 300° F. The temperatures settings for the third extruder melt zones 64 may be similar to those used for the second extruder melt zones 44, e.g., between about 420° F. and about 435° F.

An example of a typical thermoformed product 92 is illustrated in the perspective view in FIG. 8. As shown in FIG. 8, each thermoformed product 92 has a multi-layer wall 16, analogous to the blow molded bottle 10 discussed with respect to FIG. 1. The multi-layer wall 16 has an outer surface 20 and an inner surface 18. As discussed with respect to FIGS. 2 and 3, the inner surface 18 may be made from a first material 24 that includes high-density polyethylene, or other types of polyolefins. As discussed above, polyolefins may be resistant to stress cracking from, or more protective of, materials contained within the thermoformed product 92. The outer surface 20 may include materials that result in a high gloss and low coefficient of friction layer improving the decorative appearance of the thermoformed product 92, while ensuring appropriate processability through stacking, printing, or other processing operations. Such thermoformed products 92 may be used as cups, deli containers, containers for condiments, single service salad bowls, clamshell packaging, takeout containers, or parts for toys, among others.

One of ordinary skill in the art will recognize that the blow molded bottle 10 and thermoformed product 92 structures discussed above are not the only structures that a multi-layer wall 16 may be used in. Such a multi-layer wall structure may also be used in any number of products needing a high-resistance to materials in contact with the product, while retaining a high surface gloss and a low coefficient of friction on the outside of the structure. For example, a multi-layer wall 16 may be used in food service trays, displays, animal feed bins, salad bags, childrens' toys, or any other type of application where the combination of properties is appropriate to the cost of the application.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. Furthermore, although the terms "includes," "including," "comprises," or "comprising" may be used in this specification, these terms are intended to encompass both the terms "consisting essentially of," and "consisting of" in various aspects and embodiments of the present invention.

What is claimed is:

1. A plastic article comprising:
    a first layer comprising a first material, wherein the first material comprises a high density polyethylene (HDPE);
    a second layer comprising a second material, wherein the second material comprises a styrene butadiene copolymer comprising greater than about 50% styrenic monomer, by weight, wherein the first layer is disposed on the second layer to form a multilayer plastic structure, wherein the second layer forms an outer surface of the multilayer plastic structure, and wherein the outer surface has a static coefficient of friction of less than about 0.44 with another surface formed from the second material due to the chemical composition of the second material and not due to the presence of a static coefficient of friction-affecting additive;
    a third layer comprising a third material, disposed between the first layer and the second layer, and wherein the third material comprises a blend of the first material and the second material; and
    wherein the plastic article comprises a narrow opening into a larger volume enclosed by a body of the plastic article.

2. The plastic article of claim 1, wherein the outer surface has a kinetic coefficient of friction of less than about 0.42 with another surface formed from the second material due to the chemical composition of the second material and not due to the presence of a kinetic coefficient of friction-affecting additive.

3. The plastic article of claim 1, comprising a handle formed therein.

4. The plastic article of claim 1, wherein the first material, the second material, the third material, or any combination thereof, comprises an additive that does not affect the static coefficient of friction, wherein the additive comprises a pigment, a dye, a stabilizer, or any combination thereof.

5. The plastic article of claim 1, wherein the first layer comprises a polyethylene having a density of greater than about 0.95 g/cm$^3$.

6. The plastic article of claim 1, wherein the third material comprises a blend of the first material and the second material at a weight ratio of the second material to the first material of about 1:10 to about 1:100.

7. The plastic article of claim 1, wherein the second material does not comprise a blend of the styrene butadiene copolymer with another polymer.

8. The plastic article of claim 1, wherein the third material comprises a blend of the first material and the second material without additional polymer.

9. The plastic article of claim 1, wherein the second material comprises a blend of the styrene butadiene copolymer with the HDPE.

10. The plastic article of claim 1, wherein the first material comprises the HDPE having a density of about 0.95 g/cm$^3$ to about 0.97 g/cm$^3$, and wherein the first layer comprises a thickness of about 25 thousandths of an inch (mils) to about 75 mils, and wherein the second layer comprises a thickness of about 1 mil to about 10 mils, and the third layer comprises a thickness of about 13 mils to about 37 mils.

11. A plastic container comprising:
    an inner surface comprising a first material, wherein the first material comprises a high density polyethylene (HDPE);
    an outer surface comprising a second material, wherein the second material comprises a styrene butadiene copolymer, wherein the styrene butadiene copolymer comprises greater than about 50% styrene, by weight, and wherein the outer surface of the plastic container has a static coefficient of friction with a surface formed from the second material of less than about 0.44 due to the chemical composition of the second material and not due to the presence of a static coefficient of friction-affecting additive;
    a center layer disposed between the inner surface and the outer surface, wherein the center layer comprises a blend of the first material and the second material; and
    wherein the plastic container comprises a container with a narrow opening through a neck into a larger container body.

12. The plastic container of claim 11, wherein the outer surface has a kinetic coefficient of friction with a surface formed from the second material of less than about 0.42 due to the chemical composition of the second material and not due to the presence of a kinetic coefficient of friction-affecting additive.

13. The plastic container of claim 11, wherein the first material comprises a polyethylene having a density of greater than about 0.95 g/cm$^3$.

14. The plastic container of claim 11, wherein the center layer comprises a blend of the first material and the second material at a weight ratio of the second material to the first material of about 1:10 to about 1:100.

15. The plastic container of claim 11, wherein the second material does not comprise a blend of the styrene butadiene copolymer with a polystyrene.

16. The plastic container of claim 11, comprising a handle formed therein.

17. A plurality of three-layered containers, each three-layered container comprising:
- a narrow opening through a neck into a larger container body;
- an inside layer comprising a high density polyethylene (HDPE) and a thickness of about 25 thousandths of an inch (mils) to about 75 mils, wherein the HDPE comprises a density of about 0.95 g/cm$^3$ to about 0.97 g/cm$^3$;
- an outside layer comprising a styrene butadiene copolymer (SBC) having greater than about 50% styrene content, by weight, wherein the outer surface comprises a thickness of about 1 mil to about 10 mils, and wherein the outer surface has a static coefficient of friction of less than about 0.44 with another surface formed from the SBC due to the chemical composition of the SBC and not due to the presence of a static coefficient of friction-affecting additive as determined according to ASTM D 1894-93; and
- a center layer disposed between the inside layer and the outside layer, the center layer comprising regrind of waste material of inside layers and outside layers generated in production of the plurality of three-layered containers in an co-extrusion blow molding process, wherein the center layer comprises a composition ratio of about 1:10 to about 1:100 of waste material of the outside layer to waste material of the inside layer, and wherein the center layer comprises a thickness of about 13 mils to about 37 mils.

18. The plurality of three-layered containers of claim 17, wherein the outside layer does not comprise a blend of the SBC with crystal polystyrene.

19. The plurality of three-layered containers of claim 17, wherein the outer surface has a kinetic coefficient of friction of less than about 0.42 with another surface formed from the SBC due to the chemical composition of the SBC and not due to the presence of a kinetic coefficient of friction-affecting additive.

20. The plurality of three-layered containers of claim 17, comprising handles formed therein.

21. A plastic article comprising:
- a first layer comprising a first material, wherein the first material comprises a polyethylene having a density greater than about 0.95 g/cm$^3$;
- a second layer comprising a second material, wherein the second material comprises a styrene butadiene copolymer comprising greater than about 50% styrenic monomer, by weight; and
- a third layer comprised of a third material and disposed between the first layer and the second layer;
- wherein the first layer and the second layer are disposed on the third layer to form a multilayer plastic structure, wherein the second layer forms an outer surface of the multilayer plastic structure, and wherein the outer surface has a static coefficient of friction of less than about 0.44 with another surface formed from the second material due to the chemical composition of the second material and not due to the presence of a static coefficient of friction-affecting additive as determined according to ASTM D 1894-93, and wherein a weight ratio of the second material to the first material in the third material is in a range of about 1:10 to about 1:100; and
- wherein the plastic article comprises a narrow opening into a larger volume enclosed by a body of the plastic article.

22. The plastic article of claim 21, wherein the second material does not comprise a blend of the styrene butadiene copolymer with another polymer.

23. The plastic article of claim 21, wherein the outer surface has a kinetic coefficient of friction of less than about 0.42 with another surface formed from the second material due to the chemical composition of the second material and not due to the presence of a kinetic coefficient of friction-affecting additive.

24. The plastic article of claim 21, comprising a handle formed therein.

25. The plastic article of claim 21, wherein the first material, the second material, the third material, or any combination thereof, comprises an additive that does not affect the static coefficient of friction, wherein the additive comprises a pigment, a dye, a stabilizer, or any combination thereof.

* * * * *